J. E. KENNEDY.
APPARATUS FOR CUTTING VEGETABLES AND THE LIKE.
APPLICATION FILED APR. 29, 1919.

1,395,426.

Patented Nov. 1, 1921.

Inventor.
J. E. Kennedy
By his Attorney

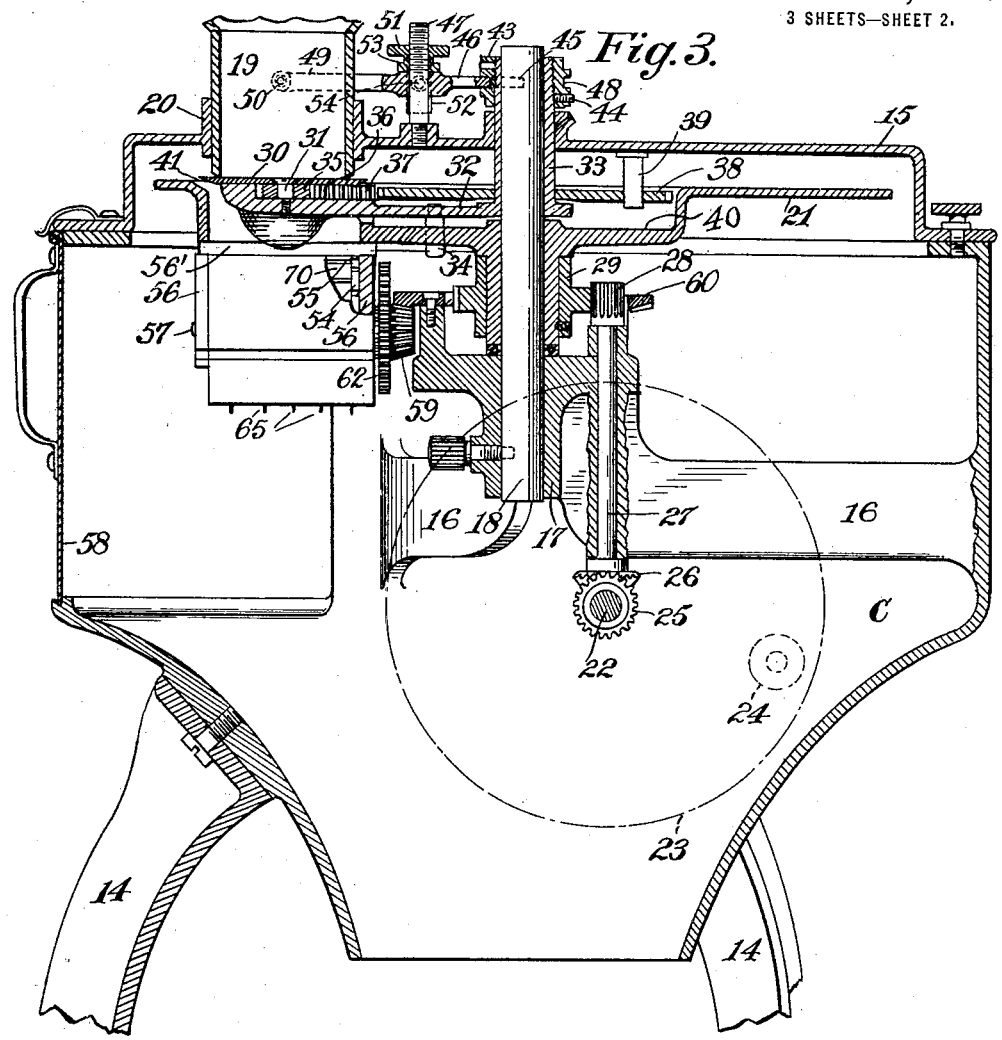
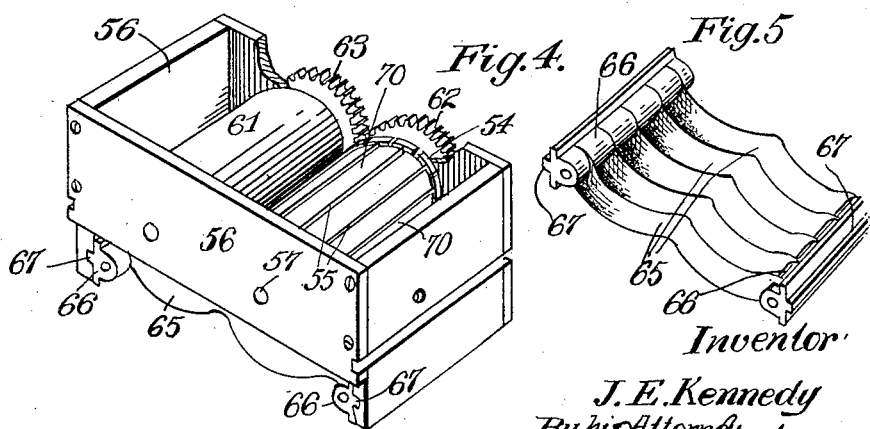

J. E. KENNEDY.
APPARATUS FOR CUTTING VEGETABLES AND THE LIKE.
APPLICATION FILED APR. 29, 1919.

1,395,426. Patented Nov. 1, 1921.
3 SHEETS—SHEET 3.

Inventor
J. E. Kennedy
By his Attorney

UNITED STATES PATENT OFFICE.

JOSEPH E. KENNEDY, OF NEW YORK, N. Y.

APPARATUS FOR CUTTING VEGETABLES AND THE LIKE.

1,395,426.

Specification of Letters Patent.   Patented Nov. 1, 1921.

Application filed April 29, 1919.   Serial No. 293,572.

*To all whom it may concern:*

Be it known that I, JOSEPH E. KENNEDY, a citizen of the United States, and a resident of the borough of Manhattan, in the city, county, and State of New York, have invented new and useful Improvements in Apparatus for Cutting Vegetables and the like, of which the following is a specification.

This invention relates to apparatus for cutting fruit, vegetables and the like preparatory to dehydrating the same and for other purposes, and it is the object of the invention to provide cutting apparatus for this purpose which is novel, simple and cheap in construction and highly efficient in operation.

It is a further object of the invention to provide in apparatus of this character changeable and adjustable cutter mechanism whereby to cut fruit, vegetables and other material into slices of variable thickness, and to cut the slices into strips, or into cubiform parts.

With these objects in view I provide a hopper or holder for the article or articles to be cut with means preferably rotatable to support an article in the hopper with a portion equivalent to the thickness of a slice to be cut from such articles projecting from the hopper, and cutting means revoluble with the support to slice the portion of the article projecting from the hopper from the article. Means are also provided to adjustably support the hopper and slicing cutter relative to the support to cut slices of variable thickness. To cut the slices into strips a series of parallel and spaced revoluble blades are provided to which the slices as they are cut are delivered, and said blades being operable by and during the rotation of the slicing cutter to cut the slices into strips. A further series of parallel and space fixed blades extending transverse to the revoluble blades are provided to which the strips are delivered as they are cut by the first set of blades to cut the strips into cubiform parts.

In the drawings accompanying and forming a part of this specification, Figure 1 is a plan view of a cutting apparatus, partly in section, showing an embodiment of my invention.

Fig. 3 is a sectional side elevation taken substantially on the line 3—3 of Fig. 1 looking in the direction of the arrows to show the relation of the cutting means to the driving means therefor.

Fig. 4 is a perspective view of the revoluble strip cutting blades and the support therefor to removably mount the same upon the support for the article in the hopper.

Fig. 5 is a perspective view of the fixed blades to cut the strips into cubiform parts.

Similar characters of reference designate like parts throughout the different views of the drawings.

Figure 1:
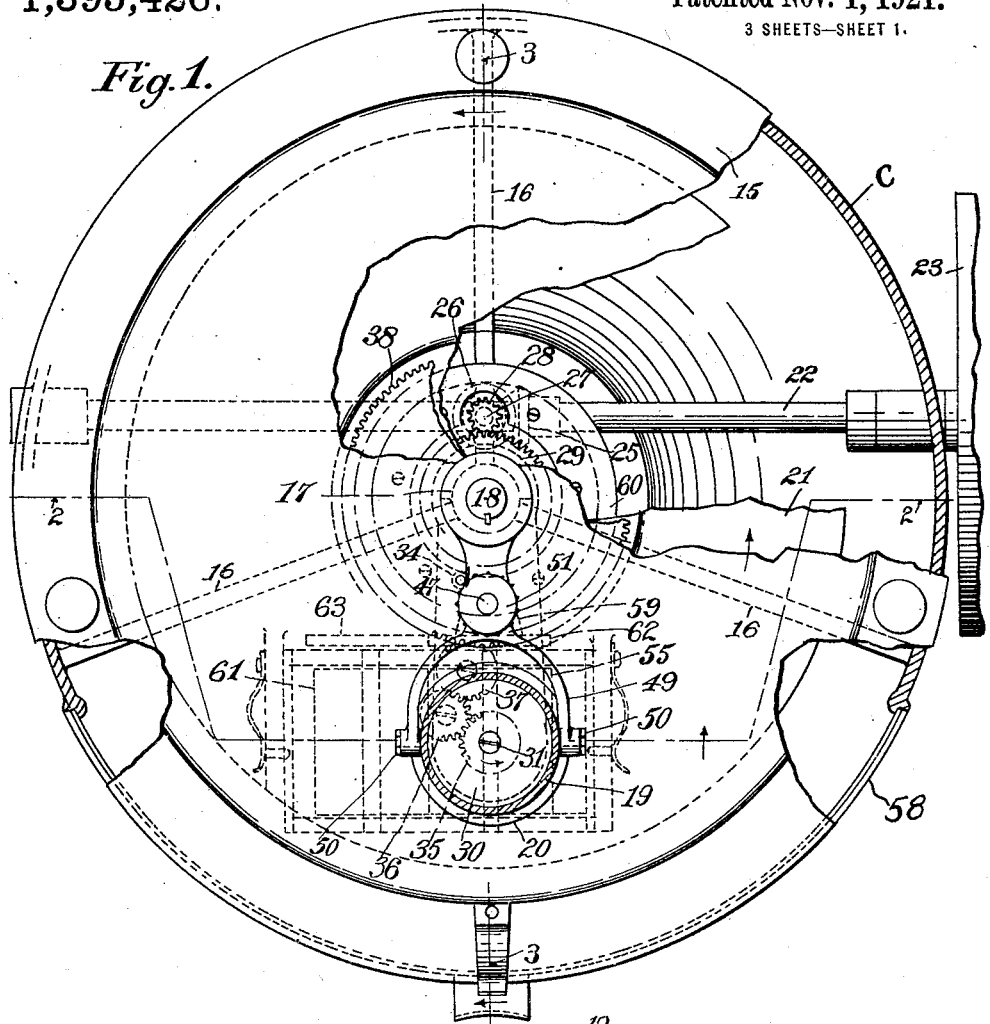
Figure 2:
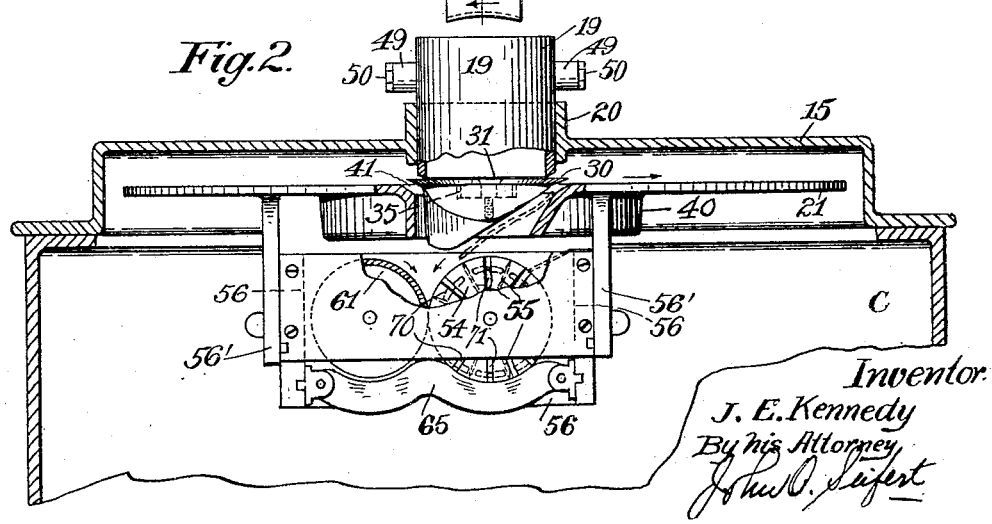
Fig. 2 is a sectional side elevation taken substantially on the line 2—2 of Fig. 1 looking in the direction of the arrow to show the arrangement of the cutting means.

In the embodiment of my invention shown in the drawings the operative parts of the mechanism are carried by a cylindrical framework (designated in a general way by C) arranged to be mounted upon a suitable support, such as standards 14, said framework having an opening in the bottom with the side walls converging downward to said opening, and having an open top which is closed by a removable cover 15. Arms 16 extend radially inward from the inner wall of the frame to the center thereof and connected at their inner ends in the form of a boss 17. A vertical standard, in the form of a shaft 18, is removably mounted in an opening in the boss 17 to extend up through an opening in the cover 15.

The articles to be cut, such as fruit or vegetables, are placed in a hopper or holder 19 mounted by the portion in which the outlet is located in a flanged opening 20 to have adjustment therein for a purpose to be hereinafter set forth. The articles are held in the hopper during the slicing thereof with a portion projecting from the hopper the thickness of a slice to be cut by a circular table or platen 21 rotatably mounted on the standard 18. The table 21 is rotated by suitable means and is shown driven from a shaft 22 rotatable on a horizontal axis and journaled at opposite ends in the wall of the frame C, one end of said shaft extending to the exterior of the frame C and having a wheel 23 fixed thereto, which may have a hand grip 24 secured thereto eccentric to its axis of rotation to manually rotate the shaft, or it may driven from a suitable source of power by a belt passing around the wheel 23. A bevel gear 25 on the shaft 22 meshes with a bevel gear 26 on a vertical shaft 27 rotatably mounted in one of the arms 16 and projects above the hub 17 connecting the inner ends of said arms 16, and has a pinion 28 fixed to said projecting end which meshes with a gear 29 mounted upon and fixed to the hub of the table 21.

To slice the portion of the article projecting from the hopper or holder 19 and supported by the table 21 I provide a cutter 30 which is revoluble with the platen and during the revolving movement thereof has rotary movement imparted thereto. This cutter comprises a disk having the periphery beveled to constitute the cutting edge and is rotatably mounted on a stud in the form of a shouldered and headed screw 31 threaded into an arm 32 extending radially from a hub 33 whereby it is mounted on the standard 18 to rotate and having sliding movement thereon, said hub being in the nature of a sleeve extending up through the cover 15 and through which the standard 18 projects. This cutter carrying arm and table 21 are so arranged that the arm will be in a plane below the upper surface of the table, and the cutter will lie contiguous to the end of the hopper projecting through the cover 15 during the cutting operation. The arm with the cutter is caused to revolve with the table 21 by a pin 34 extending downward from the arm slidably engaging in an opening in the table.

To rotate the cutter 30 simultaneously with the revolving thereof with the arm 32 a pinion 35 pinned to the cutter to rotate therewith on the screw 31 meshes with a pinion 36 rotatably carried by the arm, and which latter pinion meshes with a pinion 37 also rotatably carried by the arm, and which pinion meshes with a gear 38 loosely mounted on the hub of the arm 32 to rest upon a flanged portion of said arm and located in a recessed portion 40 of the table to be below the surface of the table. This gear is held against rotation by a stud 39 threaded into the cover 15 slidably engaging in an opening in the gear. It will be obvious that as the cutter carrying arm 32 is revolved with the table 21 that the pinion 37 will travel therewith around the gear 38 and thereby rotated and rotating the cutter and through the pinions 36, 35. By the rotating of the cutter 30 and so arranging the cutter as to lie contiguous to the end of the hopper very thin slices and delicate fruit and vegetables may be efficiently cut. The slices as they are cut from an article in the hopper are delivered through an opening 41 in the table, and the cutter carrying arm 32 has a bulbous portion to engage in said opening and arranged to direct the slice as it is cut and guide it through said opening.

Figure 13:
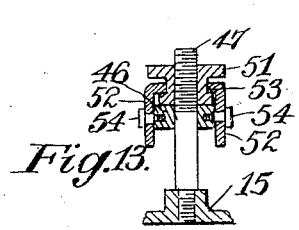
Fig. 13 is a sectional detail view to show the manner of adjustably mounting the support for the hopper and slicing cutter.

To cut slices of variable thickness the cutter carrying arm 32 with the cutter 30 and its actuating means and the hopper are mounted to have adjustment toward and away from the table 21, and as it is essential that the relation between the cutter and hopper be maintained at all times the hopper and arm with the cutter are arranged to be concomitantly adjusted. For this purpose the extended sleeve 33 of the hub of the cutter carrying arm 32 has a collar 43 threaded onto the end thereof and adapted to be locked in position by a set screw 44. To support the cutter carrying arm in adjusted position a birfurcated end 45 of an arm 46 adjustably mounted on a stud 47 secured in and projecting up from the cover 15 engages an annular groove or recess 48 in the collar 43 whereby the cutter carrying arm 32 is not only held against axial movement but is permitted to rotate. The opposite end of the arm 46 is also bifurcated, as shown at 49, to engage at opposite sides of the hopper 19 and the hopper supported thereby (Fig. 1) by screws 50 passing through the bifurcated ends of the arm engaging the hopper. The arm 46 is mounted on the stud 47 by a hand wheel 51 threaded onto the stud 47, and fingers 52 having a flanged portion to engage an annular groove 53 in the hand wheel and extending down on opposite sides of the arm 46 and secured to and carrying said arm by screws 54. It will be obvious that by screwing the hand wheel onto or off from said stud 47 the arm 46 will be raised or lowered and simultaneously therewith the hopper and the cutter carrying arm 32 through the collar 43. By threading the collar 43 onto the sleeve 33 the cutter carrying arm may be adjusted independently of the hopper to adjust the cutter to lie contiguous to the end of the hopper to compensate for wear or otherwise. See Fig. 13.

A mechanism as described is adapted for slicing an article, such as potatoes, to be utilized as "Saratoga chips" or be dehydrated in this form, and as the successive slices are cut they are directed and guided by the arm 32 due to the peculiar formation and arrangement thereof through the opening 41 in the table into the frame C and by the converging walls of the opening in the bottom of the frame through the opening in the bottom into a suitable receptacle for the same.

Figure 9:
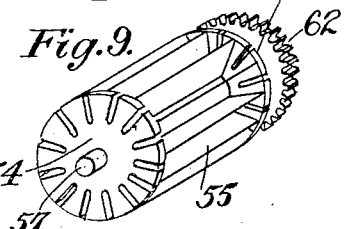
Fig. 9 is a perspective view of the strip cutting blades and the support therefor.
Figure 11:
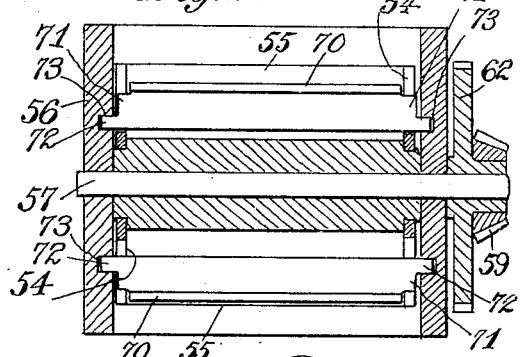
Fig. 11 is a longitudinal sectional view through the strip cutting blades and the supporting means therefor.

To cut the potatoes into strips which are commonly termed "French fried" cutter mechanism is provided to which the slices are delivered as they are cut to cut the successive slices into strips. This cutter mechanism comprises a series of parallel and spaced blades 55 mounted on a drum 54 (Fig. 9) to extend radially from the hub and between the ends of the drum. This drum is rotatably mounted in a box like frame 56 by a shaft 57 (Figs. 4 and 11) arranged to be removably connected to the lugs 56' projecting down from the table 21 with the blade carrying drum in line with the opening 41 in the table and whereby said blades will revolve with the table. To facilitate the connecting and removal of the frame 56 to the table 21 the frame C has an opening in the side adapted to be closed by a removable cover 58 (Fig. 3). To rotate the blade carrying drum during the revolving thereof with the table to cause successive blades to engage and cut the slice a pinion 59 (Fig. 3) fixed to the end of the shaft 57 is adapted to mesh with an annular gear 60 secured to the top of an annular portion projecting up from the hub 17, this gear being so arranged that the pinion 59 will be caused to mesh with the teeth thereof as the frame 56 is placed in position on the table 21. The portion of the cutter carrying arm 32 to direct the slice as it is cut through the table opening 41 also serves as an abutment for the cut slice as the slice is cut by the blades 55. To assure the severing of the slice into strips by the blades 55 a roller 61, preferably having a cover of yielding material, such as rubber composition, is rotatably mounted in the frame 56 to rotate on an axis in a horizontal plane with the axis of rotation of the blade drum with the periphery to lie contiguous to the cutting edge of the blades when the latter come opposite said roller. The roller 61 is driven in a direction toward the direction of rotation of the blades by a pinion 62 rotatable with the blade drum meshing with a pinion 63 rotatable with the roller 61. The cut strips as they are delivered from between the roller and blade drum may drop down through the bottom of the frame 56 into the frame C and directed by the sloping walls of the frame C through the opening in the bottom.

To cut the strips as they are delivered into cubiform parts a series of parallel and spaced blades 65 are provided. These blades are carried at opposite ends by bars 66 arranged with a tongue 67 to slidably and removably engage in grooves in the lower portion of the frame 56 with the blades 65 extending transverse to the blades 55 and shaped to conform to the periphery of the roller 61 and the blade drum.

Figure 6:
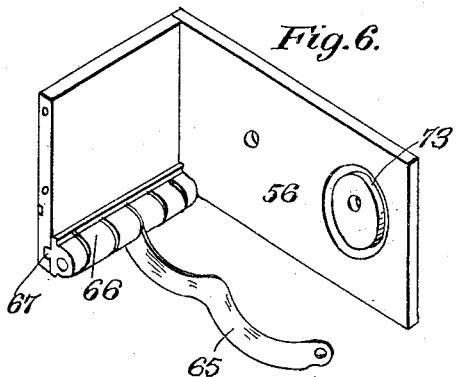
Fig. 6 is a perspective detail sectional view to show the manner of removably mounting the fixed blades on the support of the revoluble blades.
Figure 7:
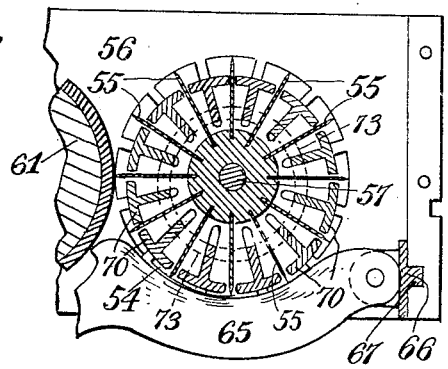
Fig. 7 is an enlarged sectional end detail view to show the manner of mounting the revoluble blades and the fixed blades in relation thereto, and the means to deliver the cut strips from the revoluble cutter blades to the fixed blades.
Figure 8:
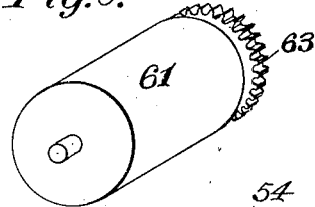
Fig. 8 is a perspective view of a roller to coöperate with the strip cutting blades.
Figure 10:
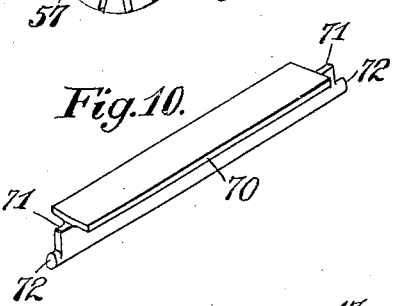
Fig. 10 is a perspective view of the means to deliver the cut strips from the strip cutting blades to the cube cutting blades.
Figure 12:
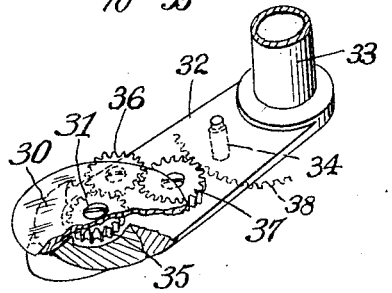
Fig. 12 is a perspective view of the slicing cutter showing the manner of supporting the same and the means to rotate said cutter.

To force the strips as they are cut and delivered from between the roller 61 and blades 55 against the blades 65 to cut the strips into cubiform parts ejectors are carried by the blade drum 54 to have radial movement between the blades 55. These ejectors comprise bars 70 of T-shape in cross section (Figs. 7 and 10) with the broad side or portion uppermost and of less length than the remaining portion of the bars to engage between the drum heads with the extended leg portion, as shown at 71, Fig. 10, to engage in radial slots in the drum heads, and a portion 72 at opposite ends to engage in cam grooves 73 (Figs. 6 and 11), which may be formed in the side walls of the frame 56, or in separate pieces secured to said sides. The cam grooves 73 are so arranged that as the drum is rotated and the ejectors approach a position in the horizontal plane with the axis of rotation of the drum, as viewed from the right of Fig. 7, the ejectors will be caused to move inward from the periphery or cutting edge of the blades until they are in their innermost position when substantially vertically above the axis of rotation of the drum, and will begin to be moved outward when in the horizontal plane with the axis of rotation of the blade drum, as viewed from the left of Fig. 7, and will be moved to their outermost position when below the axis of rotation of the blade drum 54, thereby forcing a cut strip or strips from between the blades 55 against the blades 65 and thereby severing the strips into cubiform parts and such parts through the spaces between the blades 65.

Variations may be resorted to within the scope of the invention, and portions of the invention may be used without others.

Having thus described my invention, I claim:

1. The combination of a hopper; a table to support an article in the hopper to project therefrom. a revoluble cutter interposed between the hopper and table to slice the portion of the article projecting from the hopper; means of adjustment between the table and the hopper and cutter to cut slices of variable thickness; a series of blades to which the slice is delivered as it is cut to cut the slice into strips; and a second series of blades extending transverse to the first blades to which the strips are delivered as they are cut to cut the strips into cubiform parts.

2. The combination of a hopper; a table to support an article in the hopper to project therefrom; a revoluble cutter interposed between the table and hopper to slice the portion from the article projecting from the hopper; and two series of cutting blades revoluble with the slicing cutter, one series of said blades extending transversely to the other series, and to which the slice is delivered as it is cut and operable to cut the slice into cubiform parts.

3. The combination of a hopper; a revoluble table to support an article in the hopper with a portion to project therefrom; a cutter interposed between the hopper and table and revoluble with the latter to slice the portion of the article projecting from the hopper; rotatable blades carried by the table to revolve therewith to which the slice as it is cut is delivered to cut the slice into strips; and blades carried by the table to extend transverse to the rotatable blades to which the cut strips are delivered to cut the strips into cubiform parts.

4. The combination of a hopper; a revoluble table to support an article in the hopper with a portion to project therefrom; a cutter interposed between the hopper and table and revoluble therewith to slice the portion of the article projecting from the hopper; means to support the hopper and slicing cutter to have adjustment toward and away from the table; a set of parallel and spaced rotatable blades carried by the table to revolve therewith to which the slice as it is cut is delivered to cut the slice into strips; and a second set of parallel and spaced blades carried by the table to extend transverse to the rotatable blades to which the cut strips are delivered to cut the strips into cubiform parts.

5. The combination of a hopper; a revoluble table to support an article in the hopper with a portion to project therefrom, a cutter interposed between the hopper and table and revoluble therewith to slice the portion of the article projecting from the hopper; a rotatable drum revoluble with the table carrying blades to extend longitudinally and radially therefrom to cut the slice into strips; and blades revoluble with the table to extend transverse to the stripping blades to cut the strips into cubiform parts.

6. The combination of a hopper to contain articles; a revoluble table to support an article in the hopper with a portion to project therefrom; a cutter interposed between the hopper and table and revoluble with the latter to slice the portion from the article projecting from the hopper; a drum revoluble with the table carrying blades to extend longitudinally and radially therefrom; means to rotate the drum and blades as the same are revolved with the table to cut the slice into strips; and blades revoluble with the table and extending transverse to the drum and the blades carried thereby to cut the strips into cubiform parts.

7. The combination of a hopper to contain articles; a revoluble table to support an article in the hopper with a portion projecting therefrom; a cutter interposed between the tale and hopper and revoluble with the table to slice the portion of the article projecting from the hopper; a drum revoluble with the table carrying blades to extend longitudinally and radially therefrom; means to rotate the drum and blades as to the same are revolved with the table to cut the slice into strips; blades revoluble with the table and extending transverse to the drum and the blades carried thereby; and means to deliver the cut strips to said latter cutters from the strip cutting blades to cut the strips into cubiform parts.

8. The combination of a hopper; a revoluble table to support an article in the hopper with a portion projecting therefrom; a cutter interposed between the hopper and table and revoluble therewith to slice the portion from the article projecting from the hopper; a rotatable drum revoluble with the table carrying blades to extend longitudinally and radially therefrom to cut the slices into strips; and parallel and spaced fixed blades carried by the table to extend transverse to the drum and the blades carried thereby to which the strips are delivered from the drum cutters to cut the strips into cubiform parts.

9. The combination of a hopper; a revoluble table to support an article in the hopper with a portion projecting therefrom; a cutter interposed between the hopper and table and revoluble therewith to slice the portion from the article projecting from the hopper; a drum revoluble with the table carrying blades to extend longitudinally and radially therefrom; means to rotate the drum and blades as the same are revolved with the table to cut the slice into strips; parallel and spaced fixed blades carried by the table to extend transverse to the drum and the blades carried thereby, ejectors carried by the drum to have radial movement between the blades to deliver the cut strips to the fixed blades to cut the strips into cubiform parts.

10. The combination of a hopper to contain articles; a revoluble table to support an article in the hopper with a portion projecting therefrom; a cutter revoluble with the table to cut the portion from the article projecting from the hopper; a series of circumferentially disposed and parallel blades carried by the table; means to rotate said blades as the same are revolved with a table; a roller to coöperate with said blades to cut the slice into strips; parallel and spaced fixed blades carried by the table to extend transverse to the rotatable blades; and ejectors rotatable with the rotatable blades and to have radial movement between the same to deliver the cut strips to the fixed blades to cut the strips into cubiform parts.

11. The combination of a hopper; a revoluble table to support an article in the hopper; a rotatable cutter revoluble with the table; means to rotate said cutter as it is revolved with the table to slice the article supported by the table; a rotatable drum carrying blades; means to rotate said drum with the blades as the same are revolved with the table to cut the slice into strips; and parallel and spaced blades revoluble with the table to which the strips are delivered as they are cut by the drum blades to cut the strips into cubiform parts.

12. The combination of a hopper; a revoluble table to support an article in the hopper; a rotatable cutter revoluble with the table to lie contiguous to the hopper during the cutting operation; means to rotate said cutter by the revolving movement of the table; and means to simultaneously adjust the hopper and cutter relative to the table to cut slices of variable thickness.

13. The combination of a hopper, a revoluble table to support an article in the hopper; a rotatable cutter revoluble with the table to lie contiguous to the hopper during the cutting operation and rotatable by the revolving movement of the table; and means to support the hopper and cutter to have simultaneous adjustment toward and away from the table to cut slices of variable thickness.

14. The combination of a hopper; a revoluble table to support an article in the hopper; a rotatable cutter revoluble with the table to lie contiguous to the hopper during the cutting operation and rotatable by the revolving movement of the table; means to support and simultaneously adjust the hopper and cutter toward and away from the table to cut slices of variable thickness; and cutters to which the slice is delivered to cut the same into cubiform parts.

15. The combination of a hopper; a table to support an article in the hopper; an arm extending radially from the support of and revoluble with the table; a cutter rotatably carried by the arm to lie contiguous to the hopper; means to rotate said cutter by the revolving movement thereof with the table; means to support said cutter carrying arm with the hopper to have adjustment toward and away from the table; and cutters to which the slice is delivered as it is cut to cut the slice into cubiform parts.

16. The combination of a hopper; a table to support an article in the hopper; means to rotate the table; a cutter to slice the article supported by the table; a support upon which the cutter is rotatably mounted to revolve with the table; means to rotate the cutter by the revolving movement thereof with the table; means to support said cutter carrying support with the hopper to have adjustment toward and away from the table; and cutters carried by and revoluble with the table to which the slice is delivered to cut the slice into cubiform parts; and said cutter carrying support being arranged with means to direct a slice as it is cut to said latter cutters.

17. In a vegetable cutter and the like, a set of circumferentially disposed blades; means to revolubly support said blades and rotate the same during the revolving movement thereof; a set of fixed blades revoluble with the rotatable blades to extend transversely to and in juxtaposed relation to said rotatable cutters; and means to slice a vegetable and deliver the cut slice to the rotatable blades.

18. In apparatus for cutting vegetables, a horizontal perforated plate, a knife disk rotatably suspended beneath the same and substantially parallel therewith, and means for presenting and holding sliceable material thereto, a rotatable shaft with a series of rotary cutters carried by and beneath said disk and means for giving rotary motion to said disk independently of said presenting and holding means.

19. In a machine of the character designated, a rotatable knife disk, a shaft rotatably mounted on said disk and carrying a series of cutters, and a series of stripping bars arranged concentrically, eccentric to the shaft of said cutters and movable with relation to the cutters.

20. In a machine of the character designated, a rotatable knife disk, a shaft rotatably mounted on said disk and carrying a series of rotary cutters, a series of strippng bars concentrically arranged eccentric with relation to the cutter shaft and movable with relation to the cutters, and a gang of cuber knives disposed beneath said stripping bars whereby the said stripping bars press the severed material down upon said cutter knives as the stripping bars clean the material from the cutters.

Signed in the city, county and State of New York, this 27th day of March, 1919.

JOSEPH E. KENNEDY.